United States Patent [19]
Furs et al.

[11] Patent Number: 5,371,935
[45] Date of Patent: Dec. 13, 1994

[54] METHOD FOR REMOVING A FUEL CELL

[75] Inventors: Stanley Furs, East Haven; Glen Grom, Fairfield; Paul W. Miller, Milford; David E. Wang, Newton; Arthur F. Berardi, Seymour, all of Conn.

[73] Assignee: United Technologies Corporation, Hartford, Conn.

[21] Appl. No.: 169,897

[22] Filed: Dec. 20, 1993

[51] Int. Cl.⁵ .............................................. B23P 19/00
[52] U.S. Cl. ..................................... 29/426.2; 29/426.4; 29/426.5; 29/DIG. 44; 29/402.03
[58] Field of Search ............. 29/401.1, 402.03, 402.05, 29/402.06, 402.19, 421.1, 426.1, 426.2, 426.4, 426.5, 426.6, DIG. 44; 206/0.6; 244/135 B; 220/905; 156/98

[56] References Cited

U.S. PATENT DOCUMENTS

| | | | |
|---|---|---|---|
| 2,432,025 | 12/1947 | Lorenz | 244/135 B |
| 2,724,418 | 11/1955 | Krupp | 244/135 B |
| 2,736,356 | 2/1956 | Bender et al. | 244/135 B |
| 2,777,656 | 1/1957 | Clifton | 220/905 |
| 3,978,901 | 9/1976 | Jones | 220/905 |

*Primary Examiner*—Mark Rosenbaum
*Assistant Examiner*—David P. Bryant
*Attorney, Agent, or Firm*—Terrance J. Radke

[57] ABSTRACT

A method for removing a fuel cell from an aircraft fuselage cavity includes the steps of sealing the fuel cell by securing complementary covers and gaskets or O-rings in combination with the ports of the fuel cell, installing an evacuation system in combination with the fuel cell, operating the evacuation system to evacuate the sealed fuel cell wherein the ambient air pressure of the aircraft fuselage cavity collapses the fuel cell to a predetermined height, and removing the collapsed fuel cell from the aircraft fuselage cavity.

10 Claims, 4 Drawing Sheets

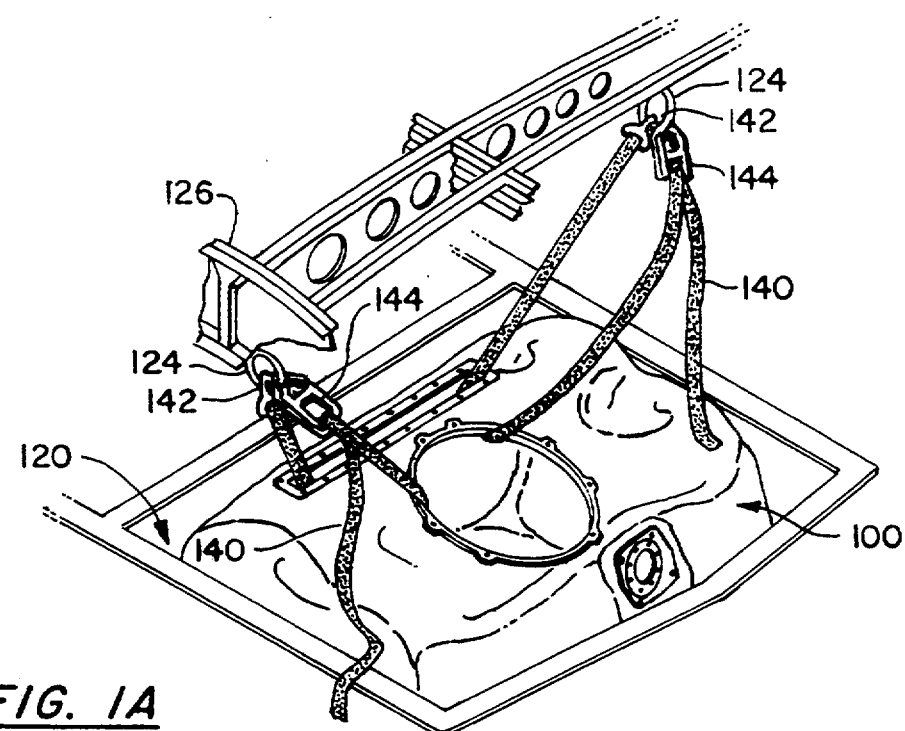
FIG. IA
*PRIOR ART*
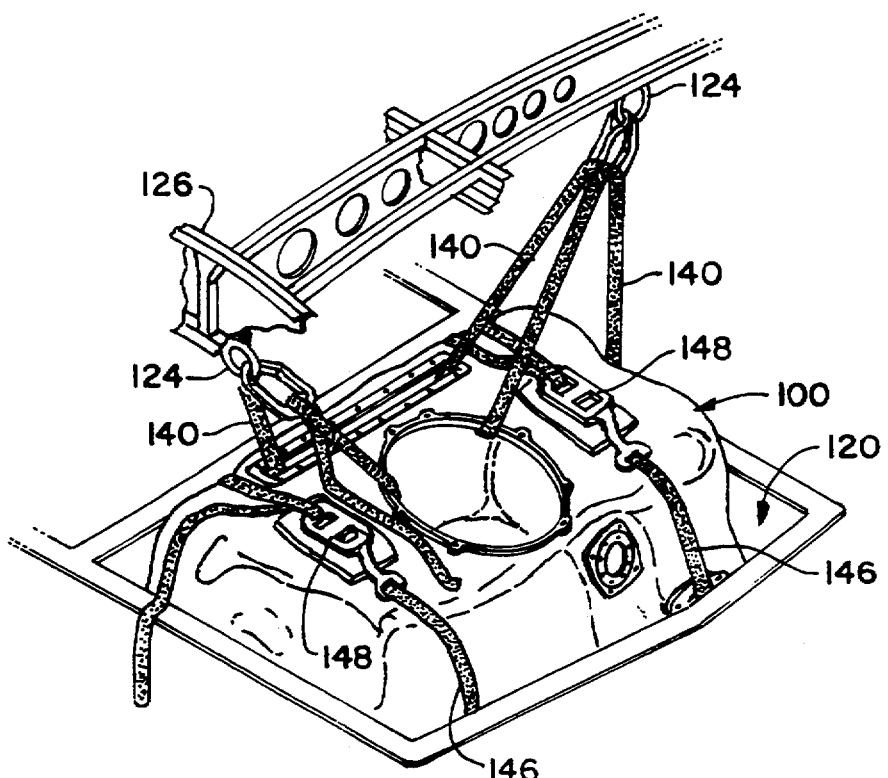
FIG. IB
*PRIOR ART*

METHOD FOR REMOVING A FUEL CELL

TECHNICAL FIELD

The present invention relates to fuel systems for aircraft, and more particularly, to a method for removing a fuel cell from a helicopter fuselage.

BACKGROUND OF THE INVENTION

Several present day aircraft have fuel systems that incorporate removable fuel bladders or cells. For example, UH-60 BLACK HAWK ® helicopters (BLACK HAWK is a registered trademark of the Sikorsky Aircraft Division of United Technologies Corporation) and derivatives thereof utilize a pair of removable primary fuel cells mounted in side-by-side cavities in the helicopter fuselage. These helicopters are primarily designed for military and other applications wherein the helicopter may be subjected to gunfire. Major design constraints imposed upon such helicopters include ballistic survivability and ease of maintainability. Removable fuel cells are utilized to enhance ballistic survivability and maintainability.

Removable fuel cells may be fabricated from a hybrid composition, e.g., a natural or synthetic elastomeric polymer such as rubber and fibrous material that is vulcanized to net shape. Fuel cells fabricated from such a hybrid composition possess a good strength-to-weight ratio, are resistant to abrasion and impact damage, are compatible with aviation fuels, and facilitate design optimization to meet ballistic survivability requirements. In addition, fuel cells may be fabricated from such a hybrid composition to embody sufficient rigidity to satisfy a requirement to be self-supporting when empty (to facilitate hardware interconnection to fuselage structure), and concomitantly possess sufficient flexibility to be collapsible to the extent necessary to facilitate removal (and replacement) thereof.

Removable fuel cells enhance the maintainability of the aircraft. If the fuel cell experiences projectile damage as the result of gunfire, the fuel cell may be removed and replaced with an undamaged fuel cell. Removal and replacement greatly facilitates maintainability as opposed to built-in fuel tanks which would require extensive maintenance rework to either: (1) repair the damaged fuel cell in situ; or (2) remove and replace the damaged fuel cell.

However, the prior art procedures for the removal and replacement of the primary fuel cells of some variants of the UH-60 BLACK HAWK ® helicopter are difficult, labor intensive, and time consuming, and present safety concerns, all of which adversely impact the maintainability of the helicopters. The fuel cells are difficult to remove and install due to the structural configuration of the fuselage cavities housing the fuel cells and the space constraints associated therewith. For example, some UH-60 BLACK HAWK ® helicopters incorporate non-removable bulkheads that define the fuselage cavities for the main fuel cells. The fuel cells are accessible for removal and replacement, but the access space 122 to accomplish removal and replacement is extremely limited. For example, a space of about twenty-nine inches in height by about forty inches in width is available for removing the main fuel cell via the aircraft cabin of the UH-60A BLACK HAWK ® helicopter (see FIG. 3).

While the fuel cells of the UH-60 BLACK HAWK ® helicopter are sufficiently flexible to facilitate collapse thereof for removal, the inherent rigidity thereof, in conjunction with limited access thereto, poses a problem in collapsing the fuel cells for removal. FIGS. 1A, 1B illustrate the prior art removal procedure for the fuel cells 100 of the UH-60 BLACK HAWK ® helicopter. The inherent rigidity of the fuel cell 100 results in the fuel cell being self-supporting in the fuselage cavity 120, i.e., the walls of the fuel cell 100 are in abutting engagement with the walls of the fuselage cavity 120. Thus, removal of the fuel cell 100 requires that the fuel cell 100 be collapsed before removal.

To collapse a self-supporting fuel cell 100, the fuel cell 100 must be first broken away from the walls of the fuselage cavity 120. With reference to FIG. 1A, straps 140 are threaded through accessible ports in the fuel cell 100 and interconnected to rings 124 mounted to an internal aircraft beam 126 by means of hooks 142 and ratcheting devices 144. The straps 140 are tensioned by operation of the ratcheting devices 144, the tensioning of the straps 140 causing the fuel cell 100 to break away from the fuselage cavity 120 and to be suspended within the fuselage cavity 120.

Once the fuel cell 100 is suspended with the fuselage cavity 120, a second set of straps 146 and ratcheting devices 148 are disposed around the periphery of the fuel cell 100 as illustrated in FIG. 1B. The ratcheting device 148 are operated to tension the straps 146, causing the collapse of the fuel cell 100. Once the fuel cell 100 has been collapsed to a height commensurate with the access space 122, the fuel cell 100 is manually removed through the access space 122.

The inherent rigidity of the fuel cell 100 and the limited access space 122 available for removal of the fuel cell 100, necessitates the use of three to four personnel to sufficiently collapse and remove the fuel cell 100 utilizing the procedure described in the previous paragraphs. The limited access space 122 increases the risk of injury to such personnel. The procedure described hereinabove is both manpower intensive and time consuming, and thus adversely affects the maintainability of the helicopter.

A need exists for a simplified method for removing fuel cells from the fuselage cavity of aircraft, particularly helicopters. The method should be compatible with the structural configuration and characteristics of the fuel cells presently incorporated in helicopters and the limited space available to access the fuel cell. The method should facilitate the collapse of the fuel cell under such circumstances, and should reduce the manpower required, the time required, and risk of injury in collapsing and removal of the fuel cell.

SUMMARY OF THE INVENTION

Objects of the present invention include providing a simplified method for removing a fuel cell from the fuselage cavity of aircraft that reduces the manpower required, the time required, and the risk of injury in collapsing and removal of the fuel cell.

These and other objects are achieved by a method for removing a fuel cell from an aircraft fuselage cavity according to the present invention that comprises the steps of sealing the fuel cell by securing complementary covers and gaskets or O-rings in combination with the ports of the fuel cell, installing an evacuation system in combination with the fuel cell, operating the evacuation system to evacuate the sealed fuel cell wherein the ambient air pressure of the aircraft fuselage cavity collapses the fuel cell to a predetermined height, and removing the collapsed fuel cell from the aircraft fuselage cavity.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIGS. 1A, 1B illustrate the prior art method for removing a main fuel cell from the fuselage cavity of a helicopter.

DETAILED DESCRIPTION OF PREFERRED EMBODIMENTS

Figure 2:
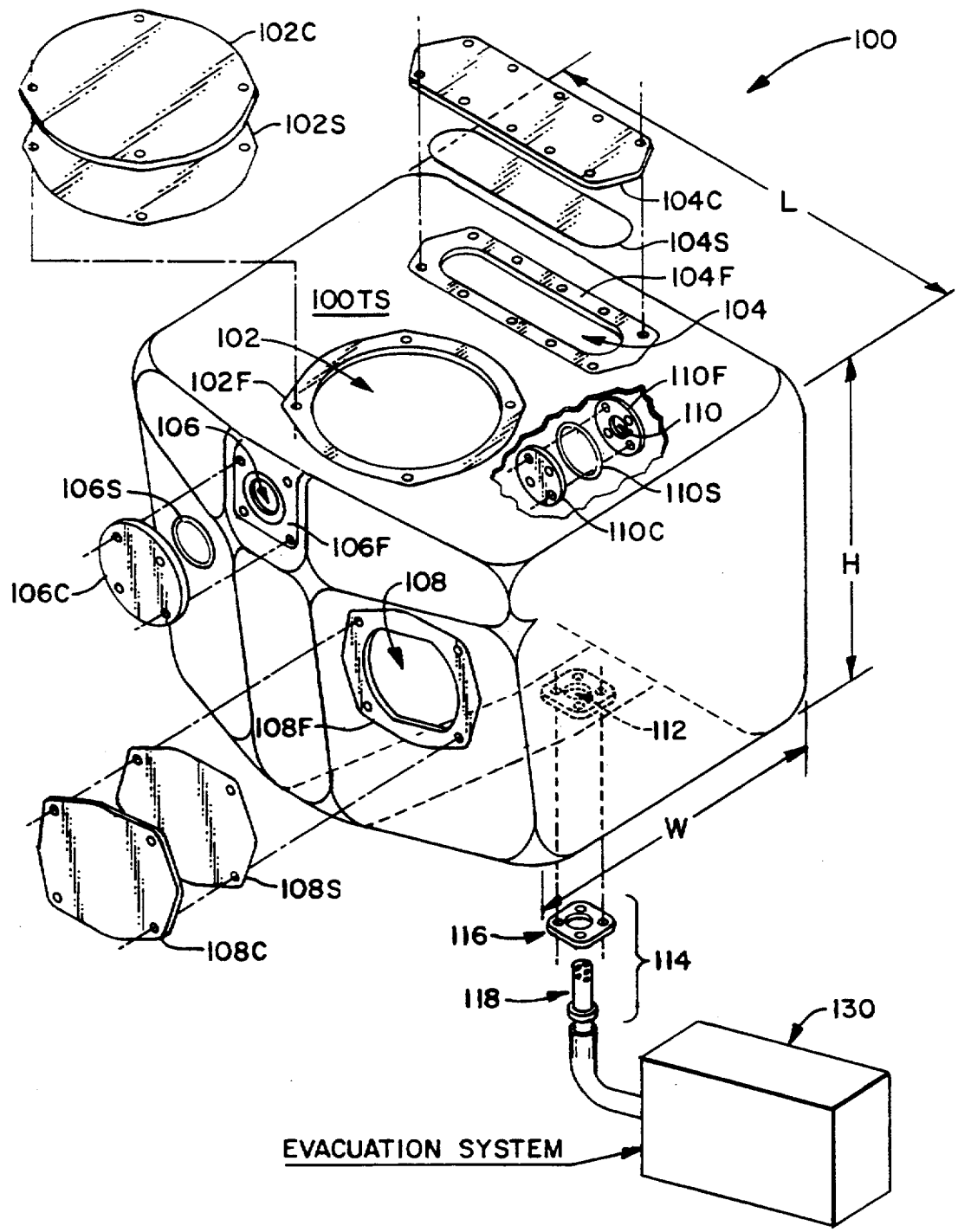
FIG. 2 is a perspective view of an exemplary embodiment of the main fuel cell utilized in UH-60A BLACK HAWK ® helicopters.

Referring now to the drawings wherein like reference characters identify corresponding or similar elements throughout the several views, FIG. 2 illustrates an exemplary main fuel cell 100 that may be removed utilizing the fuel cell removal method 10 according to the present invention. The exemplary main fuel cell 100 illustrated is the type used in the UH-60A BLACK HAWK ® helicopter. The BLACK HAWK ® helicopter has two main fuel cells 100 disposed in side-by-side fuselage cavities 120 (see FIG. 3). The left main fuel cell 100L is slightly larger than the right fuel cell 100R inasmuch as the left main fuel cell 100L, in addition to providing fuel for the engine system, provides fuel to power an auxiliary power unit (APU). For purposes of the present invention, however, the main fuel cells 100L, 100R may be considered identical, and accordingly, are generically identified hereinbelow by reference numeral 100.

Figure 3:
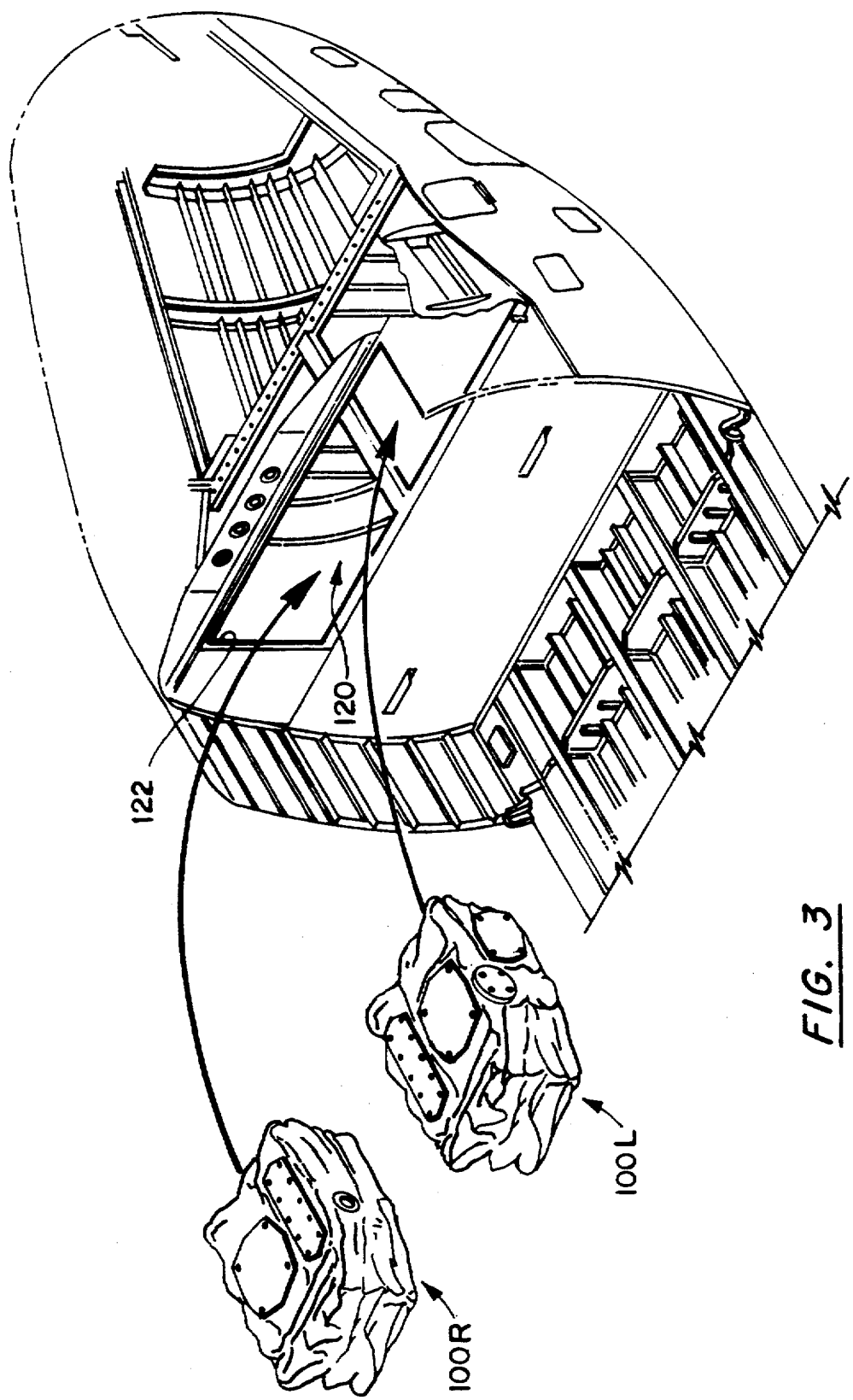
FIG. 3 illustrates the side-by-side fuselage cavities of the UH-60A BLACK HAWK ® helicopter.

The main fuel cell 100 has a generally cubical configuration (a width W of about 37.5 inches, a length L of about 41 inches, and a height H of about 37 inches) and is fabricated to possess sufficient rigidity to be self-supporting when installed in the fuselage cavity 120 (see FIG. 3). As installed, the main fuel cell 100 exhibits minimal wrinkling or bulging The main fuel cell 100 has an empty weight of about 103.5/104 pounds, a volume capacity of about 183/187 gallons, and a fuel capacity of about 177/181 gallons.

The main fuel cell 100 is preferably fabricated from a hybrid composition e.g., a natural or synthetic elastomeric polymer such as rubber and fibrous material that is vulcanized to net shape. For example, the main fuel cells 100 of the UH-60A BLACK HAWK ® helicopter are fabricated from FT-209 (Engineering Fabrics of Rockmart, Ga.), a hybrid composition of rubber, fiberglass, and nylon vulcanized to net shape. Fabrication of the main fuel cell 100 from such a hybrid composition is advantageous from a weight-to-strength standpoint, is generally resistant to abrasion and impact damage, and is compatible with aviation fuel. In addition, fuel cells 100 fabricated from such a hybrid composition provide the necessary ballistic survivability characteristics required for the main fuel cell 100. Furthermore, such main fuel cells 100 exhibit the requisite degree of rigidity to be self-supporting when installed in the fuselage cavity 120. Concomitantly, however, the rigidity exhibited by such a hybrid composition allows the main fuel cell 100 to be collapsed for removal by means of the method 10 according to the present invention as described hereinbelow.

The main fuel cell 100 includes a plurality of ports. For the exemplary embodiment illustrated in FIG. 2, the main fuel cell 100 has five ports that are readily accessible with the main fuel cell 100 installed in the fuselage cavity 120. A sensor port 102 is used to mount a probe (not shown) within the fuel cell 100 that provides continuous fuel-level data to a fuel quantity gauge system. A fuel feed port 104 is used to route fuel lines (not shown) from the main fuel cell 100 to each of the helicopter engines (and for the left main fuel cell 100L, to the APU). A gravity refueling port 106 provides the capability to refuel the main fuel cell 100 from a gravity-operated refueling source. A single point pressure fueling port 108 provides the capability to refuel or defuel the main fuel cell 100 from a pressurized pumping source. Although all fuel cells 100 for the BLACK HAWK ® helicopter are fabricated to include the pressure refueling port 108 for manufacturing commonalty, the pressure fuel port 108 is only operative in the left main fuel cell 100 in the BLACK HAWK ® helicopter. A cross feed port 110 interconnects the left and right main fuel cells 100L, 100R to provide for fuel transfers between the left and right main fuel cells 100L, 100R for weight-and-balance considerations and/or redundant operations.

Each port 102-110 is defined by an appropriately-shaped flange 102F, 104F, 106F, 108F, 110F, respectively, that is typically formed from metallic material such as aluminum. The flanges 102F-110F are secured in combination with the main fuel cell 100 by conventional fasteners, e.g., nuts and bolts. The flanges 102F-110F provide the necessary structural rigidity to attach corresponding hardware associated with the respective ports 102-110 in combination with the main fuel cell 100.

In addition to the foregoing ports, the main fuel cell 100 further includes a sump port 112 located in the bottom of the main fuel cell 100. A sump drain system 114 that includes a sump valve 116 and a sump probe 118 is installed in combination with the sump port 112. The sump drain system 114 facilitates the draining of residual fuel from the main fuel cell 100.

Figure 4:
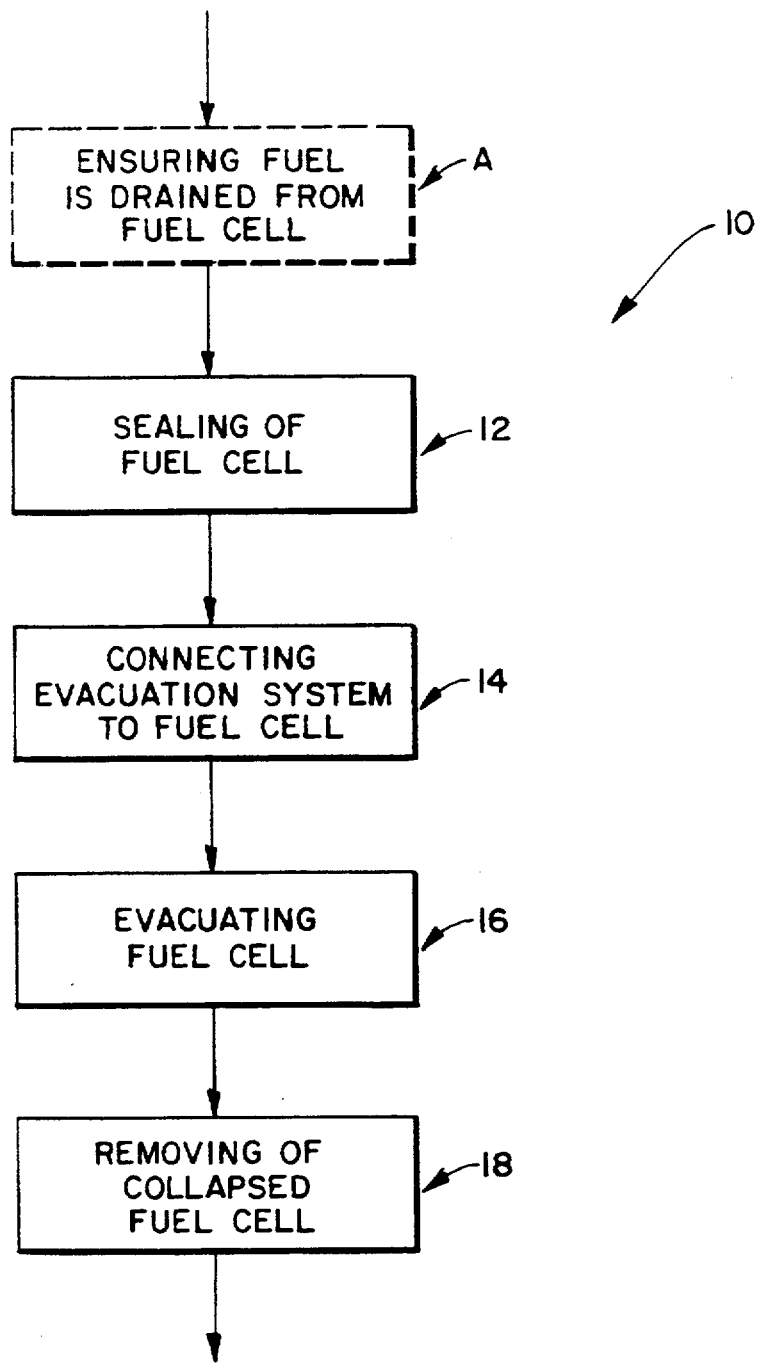
FIG. 4 is a flow chart illustrating the steps for removing a main fuel cell from a fuselage cavity according to the method of the present invention.

The process steps of the method 10 for removing the main fuel cell 100 from the fuselage cavity 120 according to the present invention are depicted in FIG. 4. The method 10 comprises the primary steps of: (12) sealing the ports 102-110 of the main fuel cell 100; (14) connecting a vacuum source 130 to the main fuel cell 100; (16) evacuating the interior of the main fuel cell 100 to cause collapse thereof; and (18) removing the collapsed main fuel cell 100 from the fuselage cavity 120. In addition to the foregoing primary steps, the method 10 according to the present invention may also include a preliminary step (A) of ensuring that all residual fuel is drained from the main fuel cell 100. This may be accomplished by connecting a fuel pump (not shown) to the sump probe 118 and operating the pump to drain any residual fuel from the main fuel cell 100. Alternatively, a pressurized pumping source may be connected to the pressure fueling port 108 and operated to drain any residual fuel from the main fuel cell 100.

The sealing step 12 comprises two substeps. In a first substep, any hardware associated with a respective port 102-110 that would obstruct the collapse and removal of the main fuel cell 100 utilizing the method 10 according to the present invention is first detached from the corresponding flanges 102F-110F and removed. Next, complementary covers 102C-110C and sealing means 102S-110S such as O-rings or gaskets are secured in combination with the respective flanges 102F-110F to seal the ports 102-110. With reference to FIG. 2, a sensor port cover 102C and a gasket 102S are secured in combination with the sensor port flange 102F to seal the sensor port 102; a fuel feed port cover 104C and a gasket 104S are secured in combination with the fuel feed port flange 104F to seal the fuel feed port 104; a gravity refueling port cover 106C and an O-ring 106S are secured in combination with the gravity refueling port flange 106F to seal the gravity refueling port 106; a pressure fueling port cover 108C and a gasket 108S are secured in combination with the pressure fueling port flange 108F to seal the pressure fueling port 108; and a cross feed port cover 110C and an O-ring 110S are secured in combination with the cross feed port flange 110F to seal the cross feed port 110.

In step 14, an evacuation system 130 is mechanically connected to the sump probe 118. The evacuation system 130 is illustrated schematically in FIG. 2 inasmuch as the method 10 according to the present invention may utilize any of several conventional systems for drawing a vacuum in a closed system. For example, the inventors have utilized an evacuation system 130 of the type sold in craftsmen's outlets to evacuate the main fuel cell 100. In step 16, the evacuation system 130 is operated to evacuate the main fuel cell 100 to cause the collapse thereof. As the main fuel cell 100 is evacuated, the ambient air pressure of the fuselage cavity 120 acts upon the external top surface 100TS thereof to cause the main fuel cell 100 to collapse. The inventors have determined that it is preferable to evacuate the main fuel cell 100 to such a degree that the main fuel cell 100 is collapsed to a predetermined height that facilitates removal thereof from the fuselage cavity 120, e.g., for the BLACK HAWK ® helicopter described hereinabove, collapsed to a predetermined height of about twenty-four inches.

Once the main fuel cell 100 has been collapsed, it is removed from the fuselage cavity 120 in step 18. One or two additional straps 146 of the type described hereinabove may be secured around the collapsed main fuel cell 100 to provide a gripping structure to facilitate removal of the collapsed fuel cell 100 from the fuselage cavity 120. Alternatively, the collapsed fuel cell 100 may be manually removed from the fuselage cavity 120 without the utilization of any additional hardware.

The method 10 described in the foregoing paragraphs has been repeatedly tested on a single main fuel cell 100. The method 10 simplified the procedure for removing the main fuel cell 100 from the fuselage cavity 120 and did not cause any damage to the main fuel cell 100. The method 10 according to the present invention was also tested under conditions when the main fuel cell 100 would have the greatest rigidity, i.e., a new main fuel cell 100 and an ambient temperature of approximately 40° F. Utilization of the method 10 did not give rise to any complications, i.e., the main fuel cell 100 was readily collapsible to the predetermined height, or have any adverse impact on the new main fuel cell 100.

A variety of modifications and variations of the present invention are possible in light of the above teachings. For example, one skilled in the art will appreciate that the evacuation system may be connected in combination with the main fuel cell prior to sealing the ports thereof. It is therefore to be understood that, within the scope of the appended claims, the present invention may be practiced otherwise than as specifically described hereinabove.

What is claimed is:

1. A method for removing a fuel cell from an aircraft fuselage cavity, the fuel cell including a plurality of ports for facilitating interconnection of the fuel cell with complementary aircraft hardware and systems, comprising the steps of:
    (1) sealing the plurality of ports of the fuel cell;
    (2) connecting an evacuation system to the fuel cell;
    (3) operating the evacuation system to evacuate the sealed fuel cell to cause collapse thereof; and
    (4) removing the collapsed fuel cell from the aircraft fuselage cavity.

2. The method of claim 1 wherein said sealing step comprises the step of securing a complementary cover and sealing means in combination with each of the plurality of ports of the fuel cell.

3. The method of claim 2 wherein said sealing step further comprises removal of complementary hardware connected to the plurality of ports prior to said securing step.

4. The method of claim 1 wherein said operating step comprises operating the evacuation system to evacuate the sealed fuel cell wherein the ambient air pressure of the fuselage cavity collapses the sealed fuel cell to a predetermined height.

5. The method of claim 1 further comprising the step of ensuring that all residual fuel is drained from the fuel cell prior to said sealing the plurality of ports of the fuel cell.

6. A method for removing a main fuel cell from a UH-60 helicopter fuselage cavity, the main fuel cell including a sensor port, a fuel feed port, a gravity refueling port, a pressure fueling port, and a cross feed port, the main fuel cell further including a sump port having a sump valve and sump probe installed in combination therewith, comprising the steps of:
    (1) sealing the sensor port, the fuel feed port, the gravity refueling port, the pressure fueling port, and the cross feed port;
    (2) connecting an evacuation system to the sump probe of the main fuel cell;
    (3) operating the evacuation system to evacuate the sealed main fuel cell wherein the ambient air pressure of the fuselage cavity collapses the sealed main fuel cell to a predetermined height; and
    (4) removing the collapsed main fuel cell from the fuselage cavity.

7. The method of claim 6 wherein said sealing step comprises the substeps of:
    (a) securing a complementary cover and a gasket in combination with the sensor port;
    (b) securing a complementary cover and a gasket in combination with the fuel feed port;
    (c) securing a complementary cover and an O-ring in combination with the gravity refueling port;
    (d) securing a complementary cover and a gasket in combination with the pressure fueling port; and
    (e) securing a complementary cover and an O-ring in combination with the cross feed port.

8. The method of claim 7 wherein hardware connected to the sensor port, the fuel feed port, the gravity refueling port, the pressure fueling port, and the cross feed port is removed prior to said securing substeps.

9. The method of claim 6 wherein said operating step comprises operating the evacuation system to evacuate the sealed main fuel cell wherein the ambient air pressure of the fuselage cavity collapses the sealed main fuel cell to the predetermined height of about twenty-four inches.

10. The method of claim 6 further comprising the step of ensuring that all residual fuel is drained from the main fuel cell prior to said sealing the sensor port, the fuel feed port, the gravity refueling port, the pressure fueling port, and the cross feed port.

* * * * *